US007131686B1

(12) United States Patent
Jo et al.

(10) Patent No.: US 7,131,686 B1
(45) Date of Patent: Nov. 7, 2006

(54) OPERATOR PROTECTIVE STRUCTURE INSTALLED ON CABIN OF CONSTRUCTION MACHINE

(75) Inventors: Chun Ho Jo, Changwon (KR); Chun Jin Yoon, Changwon (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 0 days.

(21) Appl. No.: 11/266,433

(22) Filed: Nov. 3, 2005

(30) Foreign Application Priority Data

Jun. 1, 2005 (KR) ...................... 10-2005-0046890

(51) Int. Cl.
*B62D 33/06* (2006.01)
(52) U.S. Cl. .................................. 296/190.03; 280/756
(58) Field of Classification Search ........... 296/190.01, 296/190.03; 280/756; 180/89.12
See application file for complete search history.

(56) References Cited

U.S. PATENT DOCUMENTS

| | | | | |
|---|---|---|---|---|
| 3,690,720 | A * | 9/1972 | Whisler | 296/190.03 |
| 3,933,371 | A * | 1/1976 | Graham | 280/756 |
| 4,265,328 | A * | 5/1981 | Rowa et al. | 296/190.03 |
| 5,520,442 | A * | 5/1996 | Kisami et al. | 296/190.03 |
| D438,878 | S * | 3/2001 | Brandenburg et al. | D15/30 |
| 6,419,303 | B1 * | 7/2002 | Fleming | 296/190.01 |
| 6,769,732 | B1 * | 8/2004 | Sakyo | 296/190.03 |
| 2001/0005092 | A1 * | 6/2001 | Sakyo et al. | 296/190.03 |
| 2005/0000121 | A1 * | 1/2005 | Mori | 37/347 |

OTHER PUBLICATIONS

"1996 Caterpillar 5080 Shovel", printed from the internet Mar. 18, 2006, Davies International, www.davies-international.com*
"Caterpillar 5080-6XK00096", printed from the internet Mar. 18, 2006, KJ Services, www.kjservices.co.uk.*

* cited by examiner

*Primary Examiner*—Jason Morrow
(74) *Attorney, Agent, or Firm*—Ladas and Parry LLP (57) ABSTRACT

An operator protective structure equipped on a cabin of construction machine is capable of moving the cabin along with a front guard by directly installing the front guard on the cabin fixed to an upper frame to protect the operator from an object penetrating into the front of the cabin. The cabin is provided with a bottom plate on a bottom thereof, mounted on an upper frame installed on a lower driving body and independently vibrated relative to the upper frame by connecting the bottom plate to the upper frame through vibration absorbing devices. The operator protective structure includes a front guide provided with a top bar and a bottom bar and installed up and down in front of the cabin to protect the cabin from objects penetrating into a front of the cabin and a top guide formed long on a ceiling of the cabin in a front and rear direction to protect the cabin from falling objects. The top bar is connected to a front top portion of the cabin and the bottom bar is connected to a front bottom portion of the cabin, whereby the front guide and the cabin are vibrated relative to the upper frame in a single body.

10 Claims, 7 Drawing Sheets

OPERATOR PROTECTIVE STRUCTURE INSTALLED ON CABIN OF CONSTRUCTION MACHINE

FIELD OF THE INVENTION

The present invention relates to an operator protective structure equipped on a cabin of construction machine, more specifically, to an operator protective structure equipped on a cabin of construction machine capable of moving the cabin along with a front guard by directly installing the front guard on the cabin fixed to an upper frame by a vibration absorbing device and vibrated to the upper frame to protect the operator from objects penetrated from the front of the cabin.

DESCRIPTION OF RELATED ART

A cabin of construction machine should be designed such that an operator works comfortably as well as the operator is protected from such an unexpected accident that a heavy material falls toward the cabin during the driving or the construction machine is overturned at a sloped terrain during the work in view of structure. Recently, it is urgently required to develop a technology of cabin protective structure capable of securing the safety of operator on the spot as an organization such as the International Standardization Organization(ISO), the Society of Automatic Engineers (SAE) or the like becomes to reinforce the regulation for the cabin protective structure more strictly.

According to the regulation of ISO, a falling object guard(FOG) is provided with a top guide installed on a top portion of the cabin to prevent falling objects from invading within a range of driver's work and a front guard to protect the operator from objects penetrating into the front of the cabin.

The ISO or the SAE provides a standard required to perform a drop test that a 45 kg solid steel sphere is dropped from a height of 9 m to the ground with minimum position energy of 1,360 J(level I: below 6 tons) or a drop test that a solid steel sphere with a diameter smaller than 204 mm is dropped with a position energy of 11,600 J(level II: above 6 tons) and, as for the test of forward penetration, it is required that a deformation energy satisfy 700 J for the level I and 5,800 J for the level II.

Figure 1:
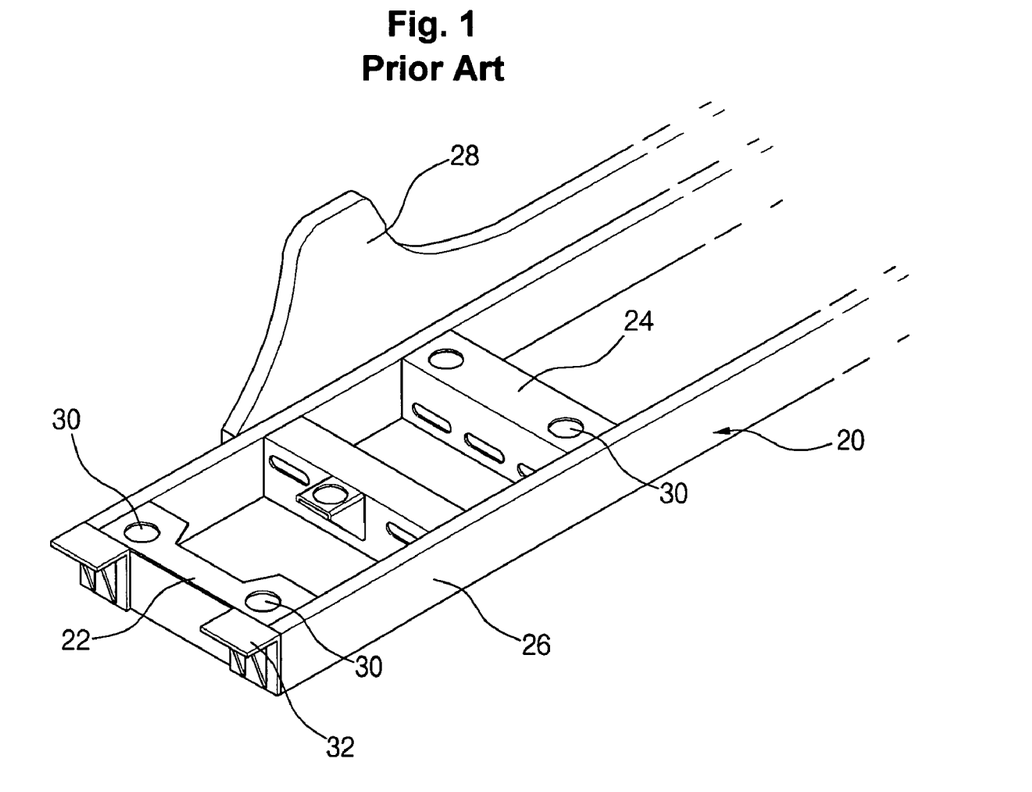
FIG. 1 is a perspective view showing a conventional upper frame to mount thereon an operator protective structure.
Figure 2:
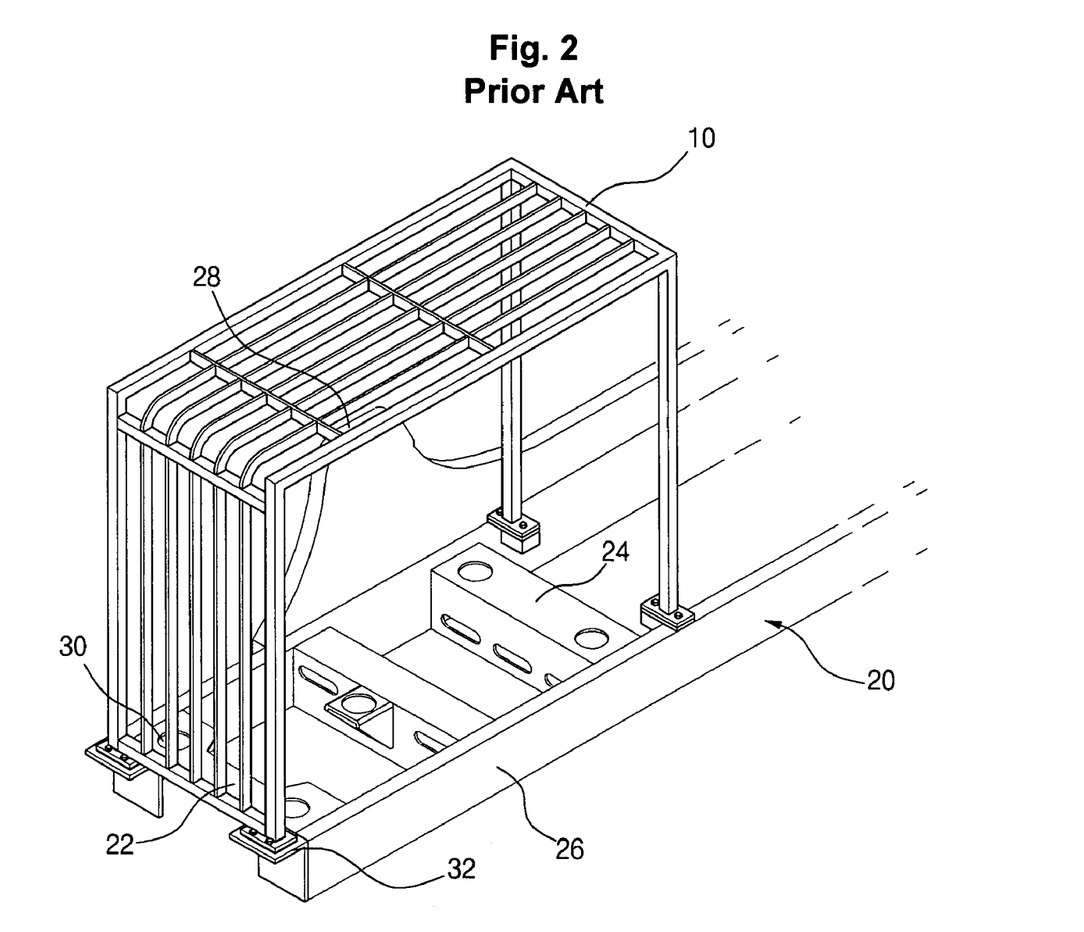
FIG. 2 is a perspective view illustrating the conventional upper frame mounted thereon the operator protective structure.
Figure 3:
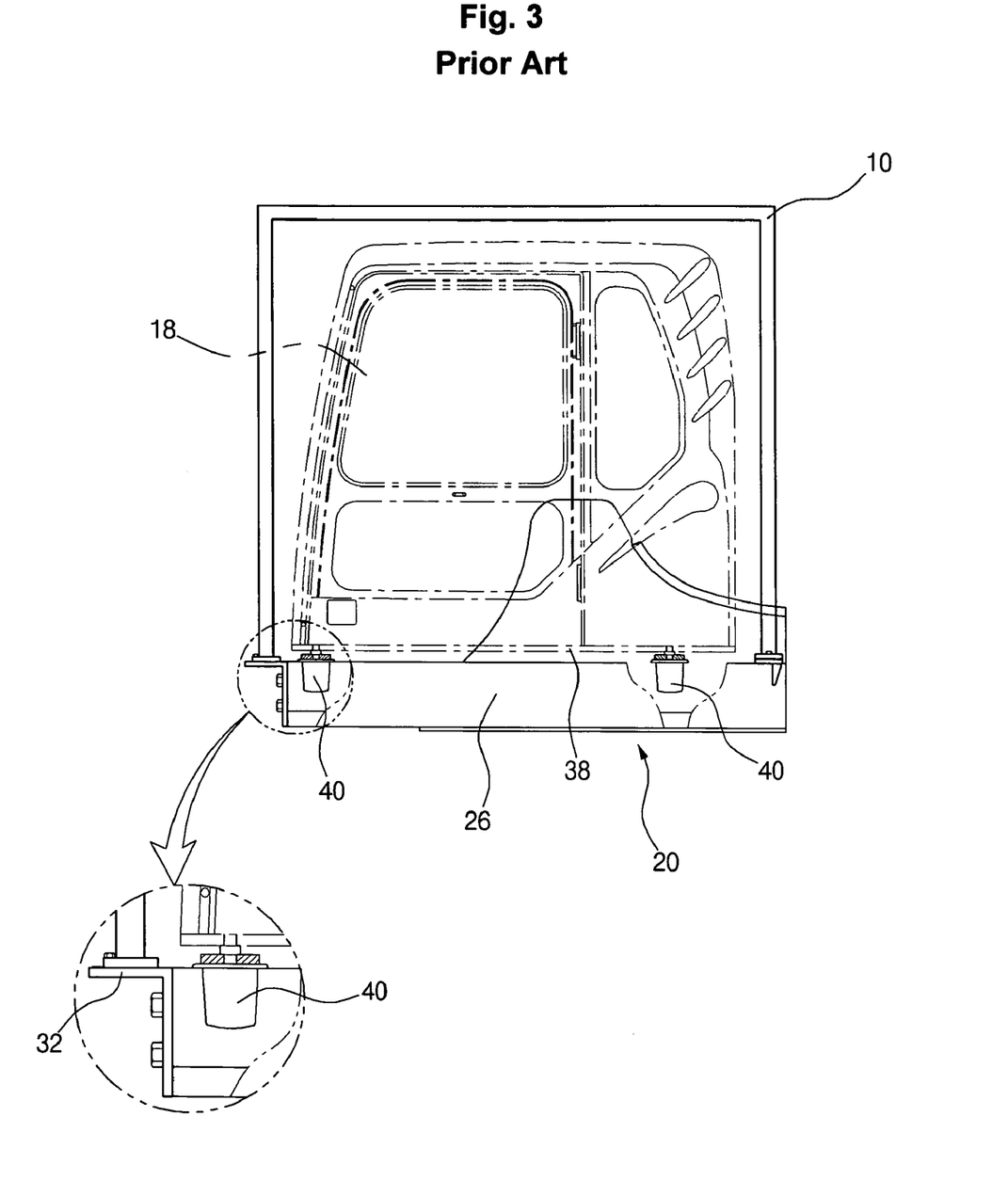
FIG. 3 is a side cross-sectional diagram of FIG. 2.

FIG. 1 is a perspective view showing a conventional upper frame to mount thereon an operator protective structure; FIG. 2 is a perspective view illustrating the conventional upper frame mounted thereon the operator protective structure; and FIG. 3 is a side cross-sectional diagram of FIG. 2.

The conventional operator protective structure 10 installed on a cabin 18 of construction machine has a structure that it is mounted on an upper frame 20 of a lower driving body(not shown). The upper frame 20 supporting the cabin 18 is provided with a front frame 22 at a front thereof, a rear frame 24 at a rear thereof, a side frame 26 at one side of the upper frame 20 for connecting the front frame 22 to the rear frame 24 and a working device frame 28 attaching a working device(not shown) to the other side of the upper frame 20. The front frame 22 and the rear frame 24 are provided with a side portion and a top portion, respectively, a plurality of through-holes 30 is formed at the top portion to mount vibration absorbing devices 40 to be described hereinafter, and brackets 32 are installed at the side portion to mount the operator protective structure 10.

The cabin 18 has a structure fixed to the upper frame 20 by various fixing units. If the cabin 18 is directly connected to the upper frame 20 by a fixing unit such as a bolt, an impact of the upper frame 20 is directly transmitted to the cabin 18. Generally, the working conditions of construction heavy machine are extremely poor. For example, if a vibration or a noise generated from the upper frame 20 due to a sloped terrain during the work is directly transmitted to the cabin 18, the operator quickly feels tired.

In order to eliminate the vibration, a plurality of vibration absorbing devices 40 is installed on the front and rear of the cabin 18 between the upper frame 20 provided with the plurality of through-holes 30 on the top surface and the bottom plate 38 of the cabin 18 to absorb the vertical vibration generated at the cabin 18.

Since the vibration absorbing devices 40 receive an elastic material such as a coil spring, a rubber, a buffer solution or the like therein and have a structure to fix the cabin 18 on the upper frame 20 using a flange or a bolt, they give some degree of buffering effect to a bouncing, a rolling or an impact force. Therefore, the operator does not quickly feel tired although the terrain is uneven.

However, if the operator drives the heavy construction machine at the driver's seat, in case when the operator protective structure 10 is directly installed on the upper frame 20 and each of the upper frame 20 and the cabin 18 is respectively assembled by the vibration absorbing devices 40, the operator protective structure 10 mounted on the upper frame 20 becomes to vibrate less, but the operator in the bouncing and rolling cabin 18 becomes to vibrate more strongly due to the vibration absorbing devices 40. Accordingly, if the operator drives the construction machine on the uneven terrain in a long time, since the operator stands still but the operator protective structure 10 is bounded and rolled, the operator becomes to be inconvenient in the view of sight and feels a dizziness by generating an optical illusion phenomenon as the front protective structure is moved in the right and left direction.

In this result, since the operator frequently drives the construction machine with separating the front protective structure from the operator protective structure, there is a danger of unexpected accident when objects penetrating into the front of the cabin.

SUMMARY OF THE INVENTION

The present invention has been made to overcome the above-described problems in the related art. It is, therefore, an object of the present invention to provide an operator protective structure installed on a cabin of construction machine, wherein a front guide is installed on the cabin in a single body.

In accordance with an aspect of the present invention, there is provided an operator protective structure mounted on a cabin of construction machine, wherein the cabin is provided with a bottom plate on a bottom thereof, mounted on an upper frame installed on a lower driving body and independently vibrated relative to the upper frame by connecting the bottom plate to the upper frame through vibration absorbing devices, the structure including a front guide provided with a top bar and a bottom bar and installed up and down in front of the cabin to protect the cabin from objects penetrating into a front of the cabin, wherein the top bar corresponding to a top side of the cabin is connected to a front top portion of the cabin and the bottom bar corresponding to a bottom side of the cabin is connected to a front bottom portion of the cabin, whereby the front guide and the cabin are vibrated relative to the upper frame in a single body and a top guide formed long on a ceiling of the cabin in a front and rear direction to protect the cabin from falling objects.

The front guide further includes a plurality of vertical protection rods for connecting the top bar to the bottom bar up and down and a plurality of horizontal protection rods for connecting the vertical protection rods.

A pair of front brackets is forwardly protruded at both front top sides of the cabin, the top bar is fixed by a bolt inserted into the front brackets, and the bottom bar is directly fixed to a front surface of the cabin through a bolt tightening process.

A top guide further includes a plurality of vertical supporting rods formed long in a front and rear direction of the cabin and a plurality of horizontal supporting rods formed in a direction perpendicular to the vertical supporting rods.

A pair of ceiling brackets with a predetermined length is provided at both top sides of the cabin, a plurality of bosses with a screw inside thereof is protrusively formed on the ceiling brackets in an upward direction and a plurality of top brackets provided with a number of holes corresponding to the bosses is formed at both side edges of the vertical supporting rods, whereby the top brackets are fixed by screwing bolts into the holes and the bosses.

In accordance with another aspect of the present invention, there is provided an operator protective structure, wherein the cabin is provided with a bottom plate on a bottom thereof, mounted on an upper frame installed on a lower driving body and provided with a front frame at a front surface and a rear frame at a rear surface and independently vibrated relative to the upper frame by connecting the bottom plate to the upper frame through vibration absorbing devices, the structure comprising a front guide provided with a top bar and a bottom bar and installed up and down in front of the cabin to protect the cabin from objects penetrating into a front of the cabin, wherein the top bar corresponding to a top side of the cabin is connected to a front top portion of the cabin and the bottom bar corresponding to a bottom side of the cabin is connected to a front bottom portion of the cabin, whereby the front guide and the cabin are vibrated relative to the upper frame in a single body and a top guide formed long in a front and rear direction between a plurality of front supporting frames vertically installed on a plurality of bottom brackets fixed to both sides of the front frame and a plurality of rear supporting frames vertically installed on a top of the bottom brackets fixed to the both sides of rear frames.

The front guide further includes a plurality of vertical protection rods for connecting the top bar to the bottom bar up and down and a plurality of horizontal protection rods for connecting the vertical protection rods.

A pair of front brackets is forwardly protruded at both front top sides of the cabin, the top bar is fixed by a bolt inserted into the front brackets, and the bottom bar is directly fixed to a front surface of the cabin through a bolt tightening process.

A top guide further includes a plurality of vertical supporting rods formed long in a front and rear direction of the cabin and a plurality of horizontal supporting rods formed in a direction perpendicular to the vertical supporting rods.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Hereinafter, a preferred embodiment of the present invention is described in detail with reference to the accompanying drawings, which does not mean defining the technical spirit and scope of the present invention but is for explaining in detail the present invention in order for one skilled in the art to which the present invention pertains to implement the present invention.

Figure 4:
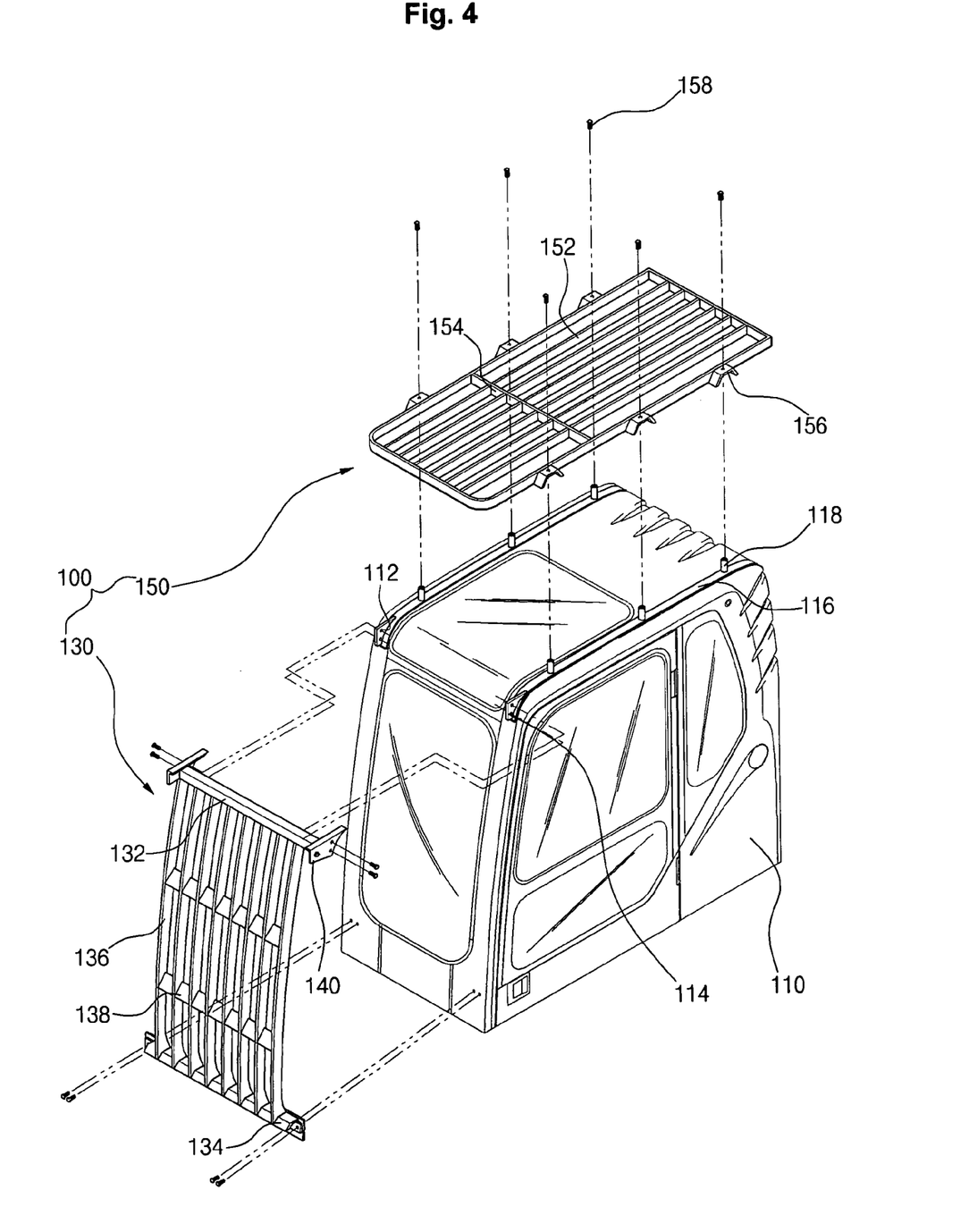
FIG. 4 is an exploded perspective view showing a construction of an operator protective structure equipped on a cabin of construction machine in accordance with one embodiment of the present invention.

Since a cabin 110 of construction machine of the present invention is provided with a bottom plate on a bottom of the cabin 110 and equipped on an upper frame 120 mounted on a lower driving body, and the bottom plate has a structure connected to the upper frame by vibration absorbing devices, it is characterized in that an operator protective structure 100 directly mounted on the cabin 110 in accordance with one embodiment of the present invention is connected to the cabin 110 in a single body, whereby it is elastically supported to the upper frame 120 along with the cabin 110.

The operator protective structure 100 includes a front guide 130 to protect the operator from objects penetrating into the front of the cabin and a top guide 150 to prevent falling objects from invading within a range of driver's work.

As described above, the operator protective structure 100 must also perform a test of dropping a test object with a position energy of 1,360 J(level I: below 6 tons) or a position energy of 11,600 J(level II: above 6 tons) or a front penetration test with a deformation energy of 700 J(level I: below 6 tons) or a deformation energy of 5,800 J(level II: above 6 tons) according to the ISO regulation or the SAE regulation.

A pair of front brackets 114 forwardly protruded at both front top sides of the cabin 110 and provided with a plurality of connection holes 112 is provided, a pair of ceiling brackets 116 with a predetermined length is provided at both top sides of the cabin 110, respectively, and a plurality of bosses 118 forming a screw inside thereof is protrusively formed on the ceiling brackets 116 in an upward direction.

Figure 5:
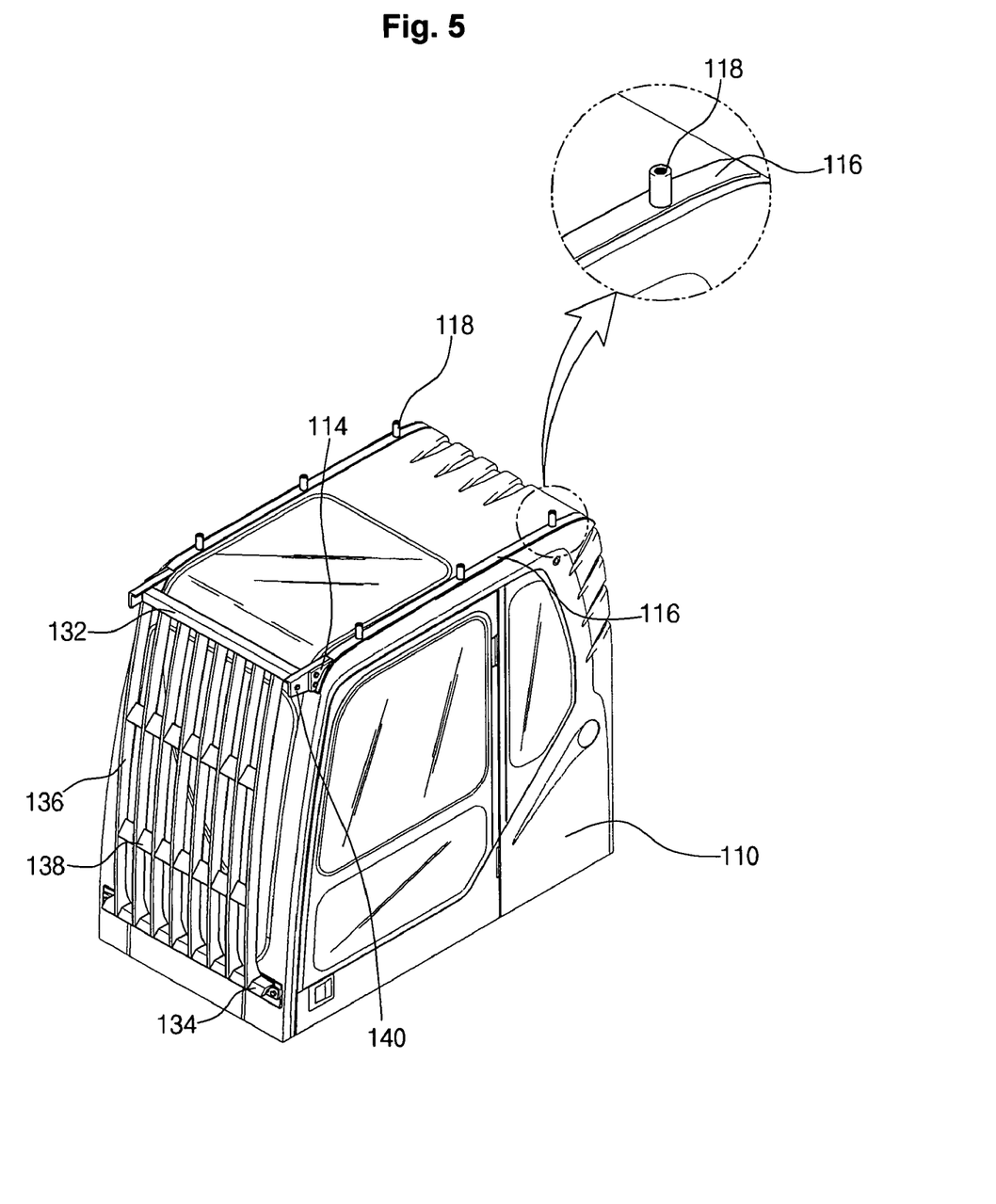
FIG. 5 is a perspective view representing a construction of a front guide equipped on the cabin of construction machine in accordance with the embodiment of the present invention.

The front guide 130 is provided with a top bar 132 corresponding to a top side of the cabin 110, a bottom bar 134 corresponding to a bottom side of the cabin 110, a plurality of vertical protection rods 136 arranged in equal distance to connect the top bar 132 and the bottom bar 134 up and down, and a plurality of horizontal protection rods 138 to connect each of the vertical protection rods 136.

At both sides of the top bar 132, a pair of side brackets 140 is provided to be connected with the front brackets 114, and the side brackets 140 are connected to the connection holes 112 through bolts or connected to the front brackets 114 by a fixing device such as a rivet. The top bar 132 is fixed by a bolt inserted into the connection holes 112 of the front brackets 114, whereas the bottom bar 134 is directly fixed to a front bottom of the cabin 134 through a bolt tightening process.

Figure 6:
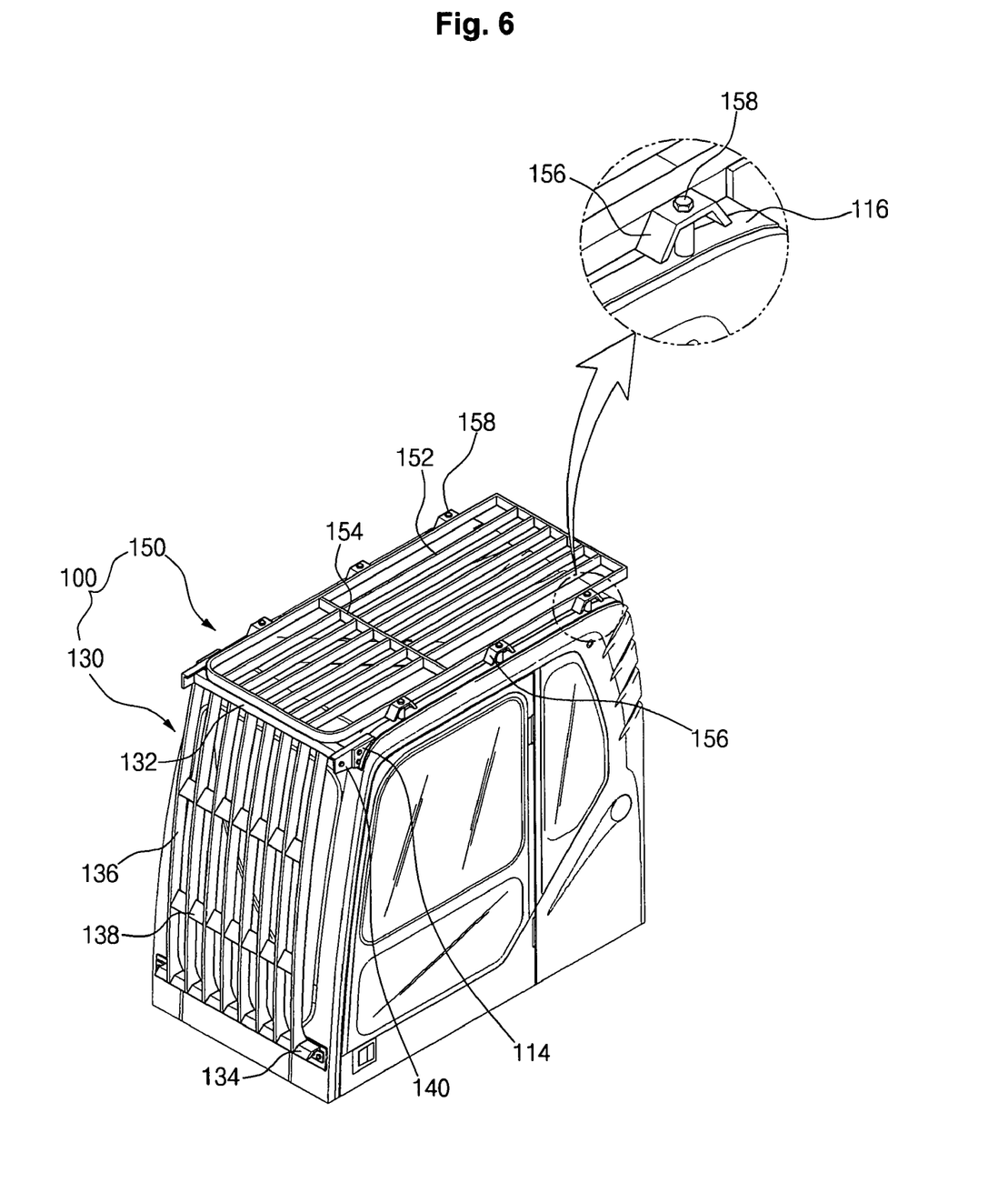
FIG. 6 is a perspective view depicting a construction of a top guide equipped on the cabin of construction machine in accordance with the embodiment of the present invention.

The top guide 150 is provided with a plurality of vertical supporting rods 152 formed long in the front and rear direction of the cabin 110 and a plurality of horizontal supporting rods 154 formed in a direction perpendicular to the vertical supporting rods 152, wherein a plurality of top brackets 156 is formed at both side edges of the vertical supporting rods 152. A plurality of holes corresponding to the bosses 118 is punched into the top brackets 156 and the top brackets 156 are fixed by screwing the bolts 158 into the holes and the bosses 118. The plurality of vertical supporting rods 152 plays a role of dispersing the load of falling objects.

Although it is preferable that the protection rods and the supporting rods are made of a metal such as steel, they can be made of a high strength alloy including aluminum for the lightness of equipments.

Figure 7:
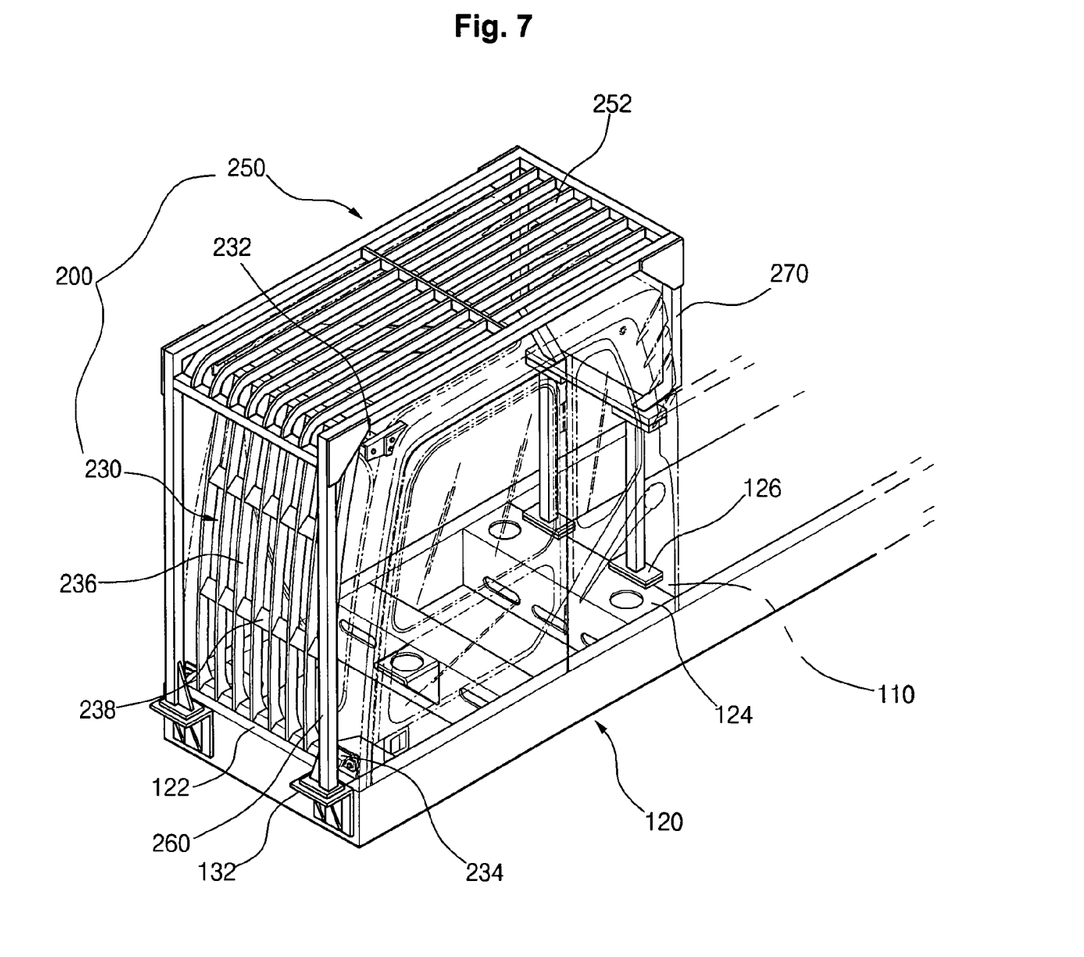
FIG. 7 is a perspective view showing a construction of front guide equipped on a cabin of construction machine and a construction of a top guide mounted on an upper frame in accordance with another embodiment of the present invention.

An operator protective structure 200 directly equipped on the cabin 110 in accordance with another embodiment of the present invention is characterized in that a front guide 230 and a top guide 250 are separately installed, the front guide 230 is connected to the cabin 110 in a single body to be elastically supported to the upper frame 120 along with the cabin 110, and the top guide 250 is connected to a top of the upper frame 120.

Similar to the first embodiment of the present invention, the front guide 230 is provided with a top bar 232, a bottom bar 234, a plurality of vertical protection rods 236 to connect the top bar 232 and the bottom bar 234 up and down, and a plurality of horizontal protection rods 238 to connect each of the vertical protection rods 236 in a right and left direction.

The top guide 250 is provided with a plurality of vertical supporting rods 252 formed long in the front and rear direction of the cabin 110 between a plurality of front supporting frames 260 vertically installed on the plurality of bottom brackets 132 fixed to both sides of the front frame 122 and a plurality of rear supporting frames 270 vertically installed on a top of the bottom brackets 126 fixed to the both sides of rear frames 124 to dispense the load of falling objects.

Because the cabin is fixed to the upper frame by the vibration absorbing devices, it is possible that the cabin and the front guide are vibrated in a single body by directly installing the front guide for protecting the operator from the objects moving toward the front of the cabin on the cabin vibrating relative to the upper frame. It is possible that those skilled in the art make various changes and modifications within the scope of the present invention.

As described above, since the cabin and the front guide are vibrated in a single body in accordance with the present operator protective structure mounted on the cabin of construction machine and, although the front guide is moved relative to the upper frame, the cabin is moved along with the front guide in accordance with the present invention, an inconvenience that the operator feels a dizziness can be overcome.

The present application contains subject matter related to Korean paten application no. 2005-46980, filed in the Korean Patent Office on Jun. 1, 2005, the entire contents of which being incorporated herein by reference.

While the present invention has been described with respect to certain preferred embodiments, it will be apparent to those skilled in the art that various changes and modifications may be made without departing from the scope of the invention as defined in the following claims.

What is claimed is:

1. An operator protective structure installed on a cabin of construction machine, wherein the cabin provided with a bottom plate on a bottom thereof, mounted on an upper frame installed on a lower driving body and independently vibrated relative to the upper frame by connecting the bottom plate to the upper frame through vibration absorbing devices, the structure comprising:

a front guide provided with a top bar and a bottom bar and installed up and down in front of the cabin to protect the cabin from objects penetrating into a front of the cabin, wherein the top bar corresponding to a top side of the cabin is connected to a front top portion of the cabin and the bottom bar corresponding to a bottom side of the cabin is connected to a front bottom portion of the cabin, whereby the front guide and the cabin are vibrated relative to the upper frame in a single body; and a top guide formed long on a ceiling of the cabin in a front and rear direction to protect the cabin from falling objects, wherein a pair of front brackets is forwardly protruded at both front top sides of the cabin, the top bar is fixed by a bolt inserted into the front brackets, and the bottom bar is directly fixed to a front surface of the cabin through a bolt tightening process.

2. An operator protective structure installed on a cabin of construction machine, wherein the cabin provided with a bottom plate on a bottom thereof, mounted on an upper frame installed on a lower driving body and independently vibrated relative to the upper frame by connecting the bottom plate to the upper frame through vibration absorbing devices, the structure comprising:

a front guide provided with a top bar and a bottom bar and installed up and down in front of the cabin to protect the cabin from objects penetrating into a front of the cabin, wherein the top bar corresponding to a top side of the cabin is connected to a front top portion of the cabin and the bottom bar corresponding to a bottom side of the cabin is connected to a front bottom portion of the cabin, whereby the front guide and the cabin are vibrated relative to the upper frame in a single body; and a top guide formed long on a ceiling of the cabin in a front and rear direction to protect the cabin from falling objects, wherein a pair of ceiling brackets with a predetermined length is provided at both top sides of the cabin, a plurality of bosses with a screw inside thereof is protrusively formed on the ceiling brackets in an upward direction and a plurality of top brackets provided with a number of holes corresponding to the bosses is formed at both side edges of the vertical supporting rods, whereby the top brackets are fixed by screwing bolts into the holes and the bosses.

3. The operator protective structure as recited in claim 1, wherein the front guide further includes:
   a plurality of vertical protection rods for connecting the top bar to the bottom bar up and down; and
   a plurality of horizontal protection rods for connecting the vertical protection rods.

4. An operator protective structure installed on a cabin of construction machine, wherein the cabin provided with a bottom plate on a bottom thereof, mounted on an upper frame installed on a lower driving body and independently vibrated relative to the upper frame by connecting the bottom plate to the upper frame through vibration absorbing devices, the structure comprising:
   a front guide provided with a top bar and a bottom bar and installed up and down in front of the cabin to protect the cabin from objects penetrating into a front of the cabin, wherein the top bar corresponding to a top side of the cabin is connected to a front top portion of the cabin and the bottom bar corresponding to a bottom side of the cabin is connected to a front bottom portion of the cabin, whereby the front guide and the cabin are vibrated relative to the upper frame in a single body; and
   a top guide formed long on a ceiling of the cabin in a front and rear direction to protect the cabin from falling objects,
   wherein the front guide further includes a plurality of vertical protection rods for connecting the top bar to the bottom bar up and down and a plurality of horizontal protection rods for connecting the vertical protection rods, and
   wherein a pair of front brackets is forwardly protruded at both front top sides of the cabin, the top bar is fixed by a bolt inserted into the front brackets, and the bottom bar is directly fixed to a front surface of the cabin through a bolt tightening process.

5. An operator protective structure installed on a cabin of construction machine, wherein the cabin provided with a bottom plate on a bottom thereof, mounted on an upper frame installed on a lower driving body and independently vibrated relative to the upper frame by connecting the bottom plate to the upper frame through vibration absorbing devices, the structure comprising:
   a front guide provided with a top bar and a bottom bar and installed up and down in front of the cabin to protect the cabin from objects penetrating into a front of the cabin, wherein the top bar corresponding to a top side of the cabin is connected to a front top portion of the cabin and the bottom bar corresponding to a bottom side of the cabin is connected to a front bottom portion of the cabin, whereby the front guide and the cabin are vibrated relative to the upper frame in a single body; and
   a top guide formed long on a ceiling of the cabin in a front and rear direction to protect the cabin from falling objects,
   wherein the front guide further includes a plurality of vertical protection rods for connecting the top bar to the bottom bar up and down and a plurality of horizontal protection rods for connecting the vertical protection rods, and
   wherein a pair of ceiling brackets with a predetermined length is provided at both top sides of the cabin, a plurality of bosses with a screw inside thereof is protrusively formed on the ceiling brackets in an upward direction and a plurality of top brackets provided with a number of holes corresponding to the bosses is formed at both side edges of the vertical supporting rods, whereby the top brackets are fixed by screwing bolts into the holes and the bosses.

6. An operator protective structure mounted on a cabin of construction machine, wherein the cabin is provided with a bottom plate on a bottom thereof, mounted on an upper frame installed on a lower driving body and provided with a front frame at a front surface and a rear frame at a rear surface and independently vibrated relative to the upper frame by connecting the bottom plate to the upper frame through vibration absorbing devices, the structure comprising:
   a front guide provided with a top bar and a bottom bar and installed up and down in front of the cabin to protect the cabin from objects penetrating into a front of the cabin, wherein the top bar corresponding to a top side of the cabin is connected to a front top portion of the cabin and the bottom bar corresponding to a bottom side of the cabin is connected to a front bottom portion of the cabin, whereby the front guide and the cabin are vibrated relative to the upper frame in a single body; and
   a top guide formed long in a front and rear direction between a plurality of front supporting frames vertically installed on a plurality of bottom brackets fixed to both sides of the front frame and a plurality of rear supporting frames vertically installed on a top of the bottom brackets fixed to the both sides of rear frames.

7. The operator protective structure as recited in claim 6, wherein a pair of front brackets is forwardly protruded at both front top sides of the cabin, the top bar is fixed by a bolt inserted into the front brackets, and the bottom bar is directly fixed to a front surface of the cabin through a bolt tightening process.

8. The operator protective structure as recited in claim 6, wherein the front guide further includes:
   a plurality of vertical protection rods for connecting the top bar to the bottom bar up and down; and
   a plurality of horizontal protection rods for connecting the vertical protection rods.

9. The operator protective structure as recited in claim 8, wherein a pair of front brackets is forwardly protruded at both front top sides of the cabin, the top bar is fixed by a bolt inserted into the front brackets, and the bottom bar is directly fixed to a front surface of the cabin through a bolt tightening process.

10. The operator protective structure as recited in claim 6, wherein a top guide further includes:
    a plurality of vertical supporting rods formed long in a front and rear direction of the cabin; and
    a plurality of horizontal supporting rods formed in a direction perpendicular to the vertical supporting rods.

* * * * *